June 24, 1930.        A. R. SPRINGER        1,766,844
AIRPLANE LIFTER
Filed July 11, 1928
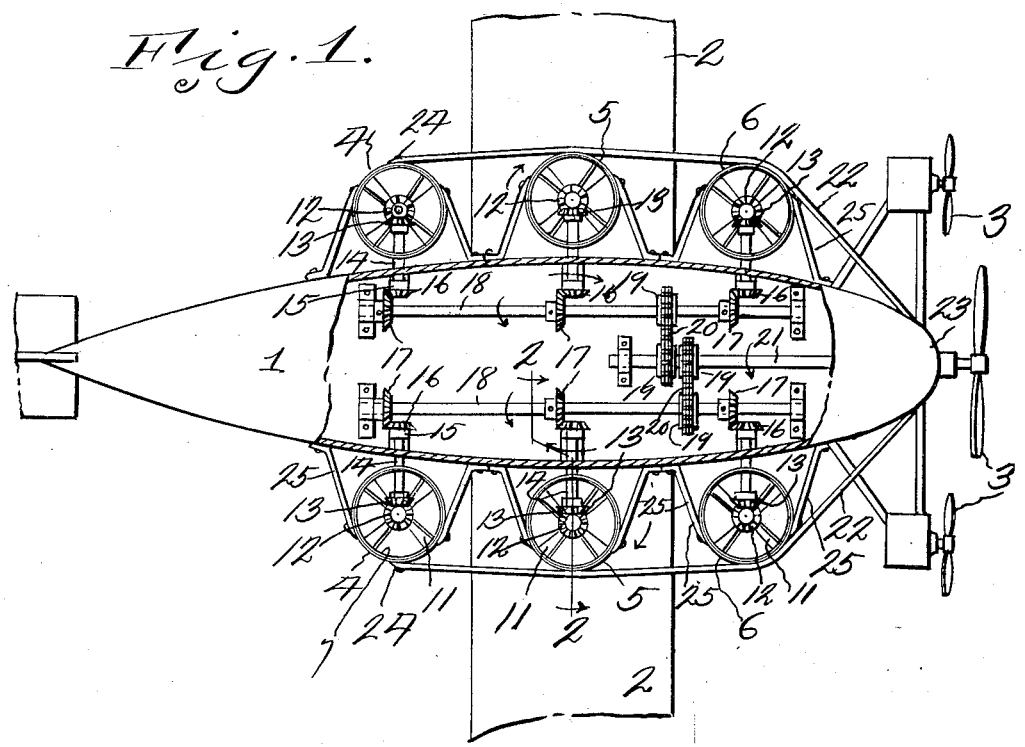
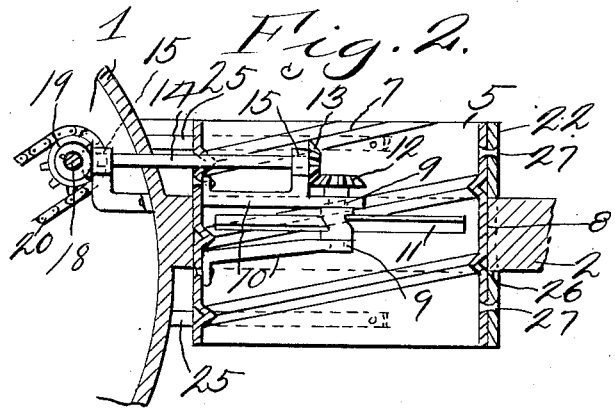
Inventor
Albert R. Springer
By Philip A. H. Ferell
Attorney Patented June 24, 1930

1,766,844

UNITED STATES PATENT OFFICE

ALBERT R. SPRINGER, OF WIRT, OKLAHOMA

AIRPLANE LIFTER

Application filed July 11, 1928. Serial No. 291,758.

The invention relates to airplane lifters and has for its object to provide a device of this character wherein rotatable blades members are disposed in horizontal planes upon the airplane and provided with driving means, said bladed members forming means whereby the plane may be elevated or lowered, thereby allowing the take off of a plane from a relatively small field or surface.

A further object is to dispose the rotatable bladed member in tubular members whereby the air will be compressed during the rapid rotation of the bladed member for insuring a positive lifting operation. Also to provide the inner periphery of the tubular casings with rifling for additionally gripping the air as compressed and for facilitating the efficiency of the lifting members.

A further object is to dispose tubular members vertically in the planes adjacent their inner ends and to provide driving connections for the bladed members in the tubular casings.

A further object is to provide a plurality of vertical tubular members at opposite sides of the fuselage and rotatable bladed members therein having driving connections with a driven shaft whereby they may be simultaneously driven.

A further object is to provide a stream lining shield at opposite sides of the fuselage and extending from the nose thereof rearwardly and outwardly over the outer side of the vertical tubular casing and terminating tangentially with the rear tubular casing. Also to extend the wings of the airplane through said stream line shields.

A further object is to provide the tubular casings with inwardly diverging brace arms anchored to opposite sides of the fuselage.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:

Figure 1 is a top plan view of a conventional form of airplane showing the lifters applied thereto.

Figure 2 is a vertical transverse sectional view taken on line 2—2 of Figure 1.

Referring to the drawing, the numeral 1 designates the fuselage of a conventional form of airplane having oppositely extending wings 2 of the usual construction. The forward end of the airplane is provided with propelling means comprising bladed propellers 3 which may be of any construction, and it is also to be understood that the lifting device hereinafter set forth may be applied to an airplane, airship or any other flying machine, lighter or heavier than air, and applicant does not limit himself in this respect.

Disposed at opposite sides of the fuselage 1 are vertically disposed cylindrical casings 4, 5 and 6, which casings are preferably provided with spiral rifling 7 clearly shown in Figure 2, and which rifling may be of any shape in cross section, however it is preferably pressed to a V-shaped form as shown to reduce the cost of manufacture. The cylindrical casings 5 extend through openings 8 in the wings 2 adjacent the opposite sides of the fuselage 1 and rotatably mounted in bearings 9 of brackets 10 are horizontally disposed bladed members 11, which members when rapidly rotated compress the air downwardly through the tubular members within which the air is confined below the bladed members, thereby causing the airplane as a whole to rise vertically or to descend vertically according to the speed of rotation of the bladed members. The bladed members in the casings 4 and 6 are similarly supported and the same numerals apply thereto. By providing the rifling, the air compression is greater and the efficiency of the device materially increased.

The bladed members 11 are provided with beveled gears 12, which mesh with the bevelled gears 13 carried by the inwardly extending horizontal shaft 14, which are rotatably mounted in bearings 15 and which have their inner ends provided with bevelled gears 16 meshing with bevelled gears 17 on counter shafts 18 within the fuselage. The countershafts 18 are rotated through sprocket and chain connections 19 and 20 with a driven shaft 21. The driven shaft may be driven in any suitable manner from the airplane engine or from a separate engine if desired.

The opposite sides of the airplane are provided with stream lining shields 22 which extend rearwardly from the nose 23 of the fuselage and outwardly and over the outer peripheries of the casings 6, thence rearwardly in engagement with the casings 5 and 4 and are anchored at 24 to the casings 4, thereby stream lining the lifting devices as a whole, as well as the inwardly diverging brackets 25 which support the casings. The shields 22 are provided with openings 26 through which the wings 2 extend, therefore it will be seen that the wings are additionally braced by the stream lining shields. The shields 22 are anchored at 27 to the cylinders 5 which extend through the wings, and as the wings 2 extend through the shields it is obvious the cylindrical casing 5 will be held against upward and downward movement. To additionally brace the wings 2 and casings 5, the brackets 25 are disposed above and below the wings 2 as clearly shown in Figure 2, and it is to be understood that as many brackets 25 may be used in connection with the cylindrical casings as desired to properly brace the same.

From the above it will be seen that lifting devices are provided in connection with airplanes which will lift the plane vertically or lower the same vertically whereby the plane may take off or land on a relatively small field. It will also be seen that the rotatable lifting propellers are disposed in horizontal positions within vertical casings whereby the air stream will be confined and compressed during the rotation of the lifting propellers and the rifling of the cylindrical casings will additionally assist the compression. It will also be seen that the devices may be applied to any kind of an airplane or airship whether heavier or lighter than air.

The invention having been set forth what is claimed as new and useful is:—

1. The combination with an airplane fuselage, wings extending outwardly from opposite sides of said fuselage, of a lifter, said lifter comprising vertically disposed cylindrical casings extending through openings in the wings, braces carried by said fuselage and cylindrical casings above and below the wings, rotatable lifting bladed members in said casings, means for rotating said bladed members, stream line shields carried by the fuselage forwardly of the wings, said shields extending outwardly and rearwardly over the outer sides of the casings, said wings extending through openings in the shields.

2. The combination with an airplane comprising a fuselage, a wing extending outwardly from said fuselage, a casing extending vertically through an opening in said wing adjacent the fuselage, a rotated bladed member in said casing, means for driving the bladed member and a streamline shield carried by the fuselage forwardly of the casing and extending outwardly and rearwardly into engagement with the outer side of the casing, said wing extending through an opening in said shield.

3. The combination with an airplane comprising a fuselage, wings extending outwardly from opposite sides of the fuselage, casings at opposite sides of the fuselage and extending through openings in the wings, said casings having their axes vertically disposed, rotatable bladed members in the casings, means for driving said bladed members, streamline shields carried by the fuselage forwardly of the casing and extending rearwardly into engagement with the outer sides of the casings, said wings extending through openings in the shields.

In testimony whereof he hereunto affixes his signature.

ALBERT R. SPRINGER.